United States Patent [19]
Howard

[11] Patent Number: 5,114,750
[45] Date of Patent: May 19, 1992

[54] TUNGSTEN AND TUNGSTEN NITRIDE COATINGS FOR METALS AND CERAMICS

[75] Inventor: Kevin E. Howard, Midland, Mich.

[73] Assignee: The Dow Chemical Company, Midland, Mich.

[21] Appl. No.: 609,670

[22] Filed: Nov. 6, 1990

[51] Int. Cl.⁵ .............................................. B05D 3/02
[52] U.S. Cl. .................................... 427/226; 427/229; 427/126.1; 427/126.2; 427/123; 427/436; 427/435
[58] Field of Search ............. 427/226, 229, 126.1, 427/126.2, 123, 435, 436

[56] References Cited

U.S. PATENT DOCUMENTS

| | | | |
|---|---|---|---|
| 3,663,280 | 5/1972 | Lee | 427/226 |
| 3,691,421 | 9/1972 | Decker et al. | 427/226 |
| 4,948,762 | 8/1990 | Krumbe et al. | 501/92 |
| 4,996,083 | 2/1991 | Moser et al. | 427/108 |

OTHER PUBLICATIONS

Nugent et al, Inorganic Chemistry 19 (1980) p. 777.
Vest et al, "Synthesis of metallo-organic compounds for MOD powders and films", MRS Proceedings, Symposium L Defect Properties and Processing of high--Technology Nonmetallic Materials (Boston, Mass.) Dec. 1985 pp. 1-10.

*Primary Examiner*—Shrive Beck
*Assistant Examiner*—Roy V. King

[57] ABSTRACT

Compositions and a process are disclosed for producing tungsten and tungsten nitride coatings on metals or ceramics, utilizing a tungsten-containing metal-organic precursor compound dissolved in an organic solvent. Conversion of the precursor compound to a tungsten or tungsten nitride coating is accomplished by heating the coated metal or ceramic to a temperature of about 600°–1200° C. under a nitrogen or other inert gas atmosphere.

6 Claims, No Drawings

TUNGSTEN AND TUNGSTEN NITRIDE COATINGS FOR METALS AND CERAMICS

BACKGROUND OF THE INVENTION

1. Field of the Invention

This invention relates to tungsten and tungsten nitride coatings for metal and ceramic substrates.

2. Description of the Prior Art

Refractory metal coatings have been used in a number of applications. These include aerospace, defense, and cutting tools. Materials to which refractory metal coatings have been applied include powders, monoliths, and fibers. Most refractory metal coatings are applied either by thermal evaporation, thermal spraying, physical vapor deposition, (sputtering) or chemical vapor deposition. For instance, the application of metal halides in a reducing atmosphere, such as tungsten hexafluoride in a hydrogen atmosphere. The first two techniques are energy intensive, sputtering is often slow and involves high-cost equipment, and chemical vapor deposition processes are often undesirable due to the formation of hydrohalic acid vapor as a by-product. In U.S. Pat. No. 3,394,087, a vitreous enamel resistance material is coated onto a substrate by brushing, dipping, spraying, or screen stencil application and subsequently fired in an inert atmosphere or a reducing atmosphere. The resistance material can contain, as a component, tungsten nitride in combination with a glass frit, such as, barium or calcium borosilicate. The mixture is prepared for application by ball-milling.

In U.S. Pat. No. 4,120,930, a mold of a ceramic material is coated with a metallic layer by spray, electrolytic, or electroless application of a solution containing powdered metal or alternatively coated by electroless deposition employing solvated aluminum hydride.

In U.S. Pat. No. 4,820,562, a metalizing composition is applied to a sintered ceramic article from a solution containing metal salts of tungstic acid in combination with an oxide, boride, carbide, and organic metal compounds of a transition metal Group IVb of the Periodic Table of the Elements. The metallizing composition is used in the form of a liquid or paste which contains a binder, such as, ethyl cellulose and water as the liquid. Subsequent to application of this coating, the dried coating is fired in a non-oxidizing atmosphere.

Sarin et al disclose the preparation of improved cutting tools and cutting tool inserts in U.S. Pat. No. 4,441,894. Physical vapor deposition or chemical vapor deposition techniques are used to apply refractory materials to a composite silicon nitride substrate.

Other methods of protecting ceramic or metal bodies against mechanical and thermal action are disclosed in U.S. Pat. Nos. 4,828,934; 4,011,064; 4,847,111; 3,637,422; and 4,714,660.

Nugent et al in Inorganic Chemistry 1980, 19, 777 disclose preparation of an organoimido complex produced by reacting tungsten hexachloride with tert-butylamine in hexane. No suggestion for the use of this complex is disclosed.

SUMMARY OF THE INVENTION

A method of protecting a metal or ceramic body from mechanical and thermal deterioration is disclosed. In the process of the invention, a tungsten-containing metal-organic precursor compound is applied to a metal or ceramic body from a solution of said compound. The metal-organic compound coated on the metal or ceramic body is converted to tungsten or tungsten nitride by heating at a temperature of about 600°-1200° C. under a nitrogen or other inert gas atmosphere.

A tungsten coating has been applied to mullite whiskers utilizing the process of the invention. The tungsten coated mullite whiskers have been found to be useful for improving the fracture toughness of ceramic composite materials containing said tungsten coated mullite whiskers.

It is contemplated that useful tungsten or tungsten and tungsten nitride coatings can be applied to metals or ceramic materials, in accordance with the process of the invention, (1) as electroconductive coatings on the surface of a ceramic material, (2) as protective coatings on ceramics in order to minimize mechanical and thermal wear, (3) as hard coatings on metal or ceramic substrates subjected to abrasive wear, such as, cutting tools, (4) as integrated circuit diffusion barriers, (5) as coatings for metal or ceramic mold surfaces, (6) and as coatings for abrasive particles to improve resistance to wear.

DETAILED DESCRIPTION OF THE INVENTION

This invention is based upon the discovery that tungsten and tungsten nitride coatings can be easily applied to metal or ceramic bodies by the application of a tungsten-containing metal-organic precursor compound from an organic solvent solution. Conversion of this precursor coating is accomplished by heating at a temperature of about 600°-1200° C. under a nitrogen atmosphere to produce a coating containing a mixture of tungsten and tungsten nitride or under another inert gas atmosphere to produce a tungsten coating.

The coating process of the invention is particularly advantageous over the prior art methods of applying refractory metal coatings to metals and ceramics which often involve energy intensive, slow processes which may involve the use of high cost equipment and the formation of undesirable, toxic vapour by-products. The tungsten-containing metal-organic compound precursor to the tungsten or tungsten nitride coatings of the invention on metal or ceramic substrates has the formula:

$$(NHR)_2-W-(NR)_2$$

wherein R is individually selected from an alkyl group of 1-5 carbon atoms or an aryl group of 5-10 carbon atoms. The precursor compound can be prepared in accordance with the following procedure, as disclosed by Nugent et al, cited above.

Tungsten hexahalide, for instance, tungsten hexachloride is dissolved in hexane, in which it has limited solubility. It is, thereafter, reacted with an excess of an alkyl or aryl amine, for instance, tert-butylamine in hexane in accordance with the following equation:

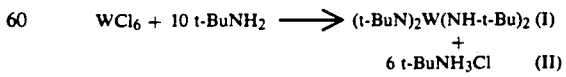

The desired hexane-soluble product (I) is readily separated from the insoluble tert-butylammonium chloride (II). Recrystallization from toluene at −40° C. provides white cubes of (I). Since these compounds do not contain direct metal-to-carbon bonds, they cannot properly be termed organometallic compounds. They are, instead, referred to as metal-organic compounds.

The coating process of the invention is useful in the production of articles having diverse applications. A specific use is as a coating applied to mullite whiskers. The subsequent conversion of the precursor coating to tungsten by heating in an argon atmosphere provides modified mullite whiskers, which when incorporated into ceramic composites, improve the fracture toughness of said composites, in comparison with the use of uncoated mullite whiskers.

Other uses contemplated for the tungsten or tungsten nitride coatings of the invention are the preparation of hard coatings for multi-phase micro structures, such as the coating of cemented carbides, which are used in many cutting applications of metallic and non-metallic materials.

Cemented carbides are usually prepared as a sintered product produced from a mixture of tungsten carbide powder and an iron-group binder metal, usually cobalt or nickel. Additives are included in some grades of cemented carbides to obtain improvements in certain properties, such as, improved strength and resistance to cratering. Such additives may include one or more carbides, such as, titanium carbide, hafnium carbide, tantalum carbide, niobium carbide, vanadium carbide, molybdenum carbide, and chromium carbide, as well as, nitrides, such as, titanium nitride. Improved resistance to abrasive wear and cratering without a significant decrease in tool strength, has been sought by applying a thin coating on the surface of the cemented carbide. This composite makes it possible to achieve inceased resistance to abrasive wear and cratering, provided by the coating, while the substrate has adequate resistance to breakage and deformation. One of the first coatings proposed was titanium carbide, which not only substantially improved the life of the cutting tool, but also permitted a considerable increase in cutting speeds. Another coating that has achieved commercial recognition is a so-called ceramic coating in the form of an oxide, such as, aluminum oxide. Chemical vapor deposition as a means of coating metal carbides on cemented carbide substrates has been of interest for the past two to three decades. Coatings of nitrides, silicides, and carbides of the metals of Group IVa (titanium, zirconium, hafnium), Group Va (vanadium, niobium, tantalum), and Group VIa (chromium, molybdenum, and tungsten) of the Periodic Table of the Elements have been applied to cemented carbide substrates by chemical vapor deposition in an effort to improve the wear characteristics of cemented carbide cutting inserts. It is contemplated that the tungsten or tungsten and tungsten nitride coatings of the invention will provide improved resistance to wear and cratering without a significant decrease in tool strength. The Periodic Table of the Elements referred to above is that contained in the *Handbook of Chemistry and Physics*, 52nd Edition, Chemical Rubber Company.

It is also contemplated that the tungsten or tungsten and tungsten nitride coating of the invention will be useful in modifying the surface of abrasive particles to produce novel coated particles useful as an abrasive. Super hard materials, such as, diamond and cubic boron nitride exhibit outstanding ability as abrasives for machining both metallic and non-metallic materials. In particular, these abrasives perform well in the grinding mode. However, the maximum grinding performance expected of these materials is never obtained because of the difficulty of retaining the abrasive particles in the grinding tool matrix or bonding system. Premature gross pull out of only partially used grit has been a major factor in grinding wheel wear in resin bonded, vitreous, or metal bonded grinding wheels.

It is contemplated that the tungsten or tungsten and tungsten nitride coatings prepared in accordance with the process of the invention will provide adherent coatings which can be applied to abrasive particles, such as, cubic boron nitride, so as to provide a tungsten or tungsten and tungsten nitride coating. Tungsten has been found to closely match the thermal expansion characteristics of cubic boron nitride and, therefore, is expected to produce low stress bonds upon application to cubic boron nitride. It is, therefore, contemplated that coating cubic boron nitride particles with tungsten or mixtures of tungsten and tungsten nitride, will provide abrasive particles which consist mainly of cubic boron nitride having a rough, granular adherent coating composed of tungsten or tungsten and tungsten nitride chemically bonded to the surface of said cubic boron nitride.

It is also contemplated that ceramic bodies can be protected against mechanical and thermal action, that is, against wear in high temperature applications, by the application of a tungsten or tungsten and tungsten nitride coating applied in accordance with the process of the instant invention. For instance, a ceramic substrate, such as silicon carbide or silicon nitride, which may be sensitive to mechanical stress or wear action, can be coated with a layer containing tungsten or tungsten and tungsten nitride to achieve a protective effect by dipping the ceramic into an organic solvent solution of the tungsten-containing metal-organic compound precursor of the invention and subsequently converting said precursor to tungsten or tungsten and tungsten nitride. As will be apparent to those skilled in the art, many other ceramics can be protected from thermal and mechanical wear by the application of the tungsten or tungsten and tungsten nitride coatings of the invention.

It is contemplated that the tungsten or mixed tungsten nitride and tungsten coatings of the invention can be used to provide new and improved constructions in mold walls. Metal and ceramic panels have been utilized as components for various structures, such as, the walls of molds, ovens, and other enclosures, including the bodies of vehicles and equipment exposed to ambient or extreme variations in temperature. Most of the panel structures of the prior art have utilized, for heat transfer purposes, relatively complex assemblies requiring many fabricating operations. These are relatively costly to fabricate and difficult to maintain. In accordance with the instant invention, it is contemplated that coatings applied in accordance with the process of the invention, will provide improved composites at substantial reductions in cost of producing such structures, as well as, improvements in the structures themselves. It is, therefore, contemplated to use a thin coating of tungsten, or a mixture of tungsten and tungsten nitride, on the surface of a mold structure to receive the heat of the molding process while the substantially thicker wall material of the mold, which is relatively inexpensive, is used to provide rigidity in the mold. Such mold structures are generally made of such materials as ceramics or mortar and, accordingly, rapidly dissipate heat applied to a metallic coating on said mold structure. Thus, molding components can be made of portland cement, a ceramic material, carbon, pyrolytic graphite, or other material having sufficient strength to support the structure under the expected operating conditions.

In accordance with the process of the present invention, a mold cavity can be coated with the tungsten-containing metal-organic compound precursor of the present invention, dissolved in an organic solvent, such as an alkyl aliphatic solvent, and, subsequently, converted to tungsten or tungsten and tungsten nitride, by heating at a temperature of about 600°–1200° C. under the desired atmosphere to convert the precursor to tungsten or a mixture of tungsten and tungsten nitride. It is also contemplated that, alternatively, the mold surface be first coated with a metal having relatively high heat conductivity, such as, aluminum, copper, nickel, steel, or other metals, such as, titanium and molybdenum by spray, electrolytic or electroless coating methods.

It is also contemplated to form a metalized coating on a sintered ceramic article, such as, a sintered nitride ceramic article. Heretofore, a sintered silicon nitride article provided with an electroconductive coating, has been prepared by preparing a porous, sintered, silicon nitride ceramic article by the reactive sintering method. For example, infiltrating the surface region of the sintered ceramic article with ammonium molybdate and, subsequently, reducing the infiltrated surface region, thereby giving rise to an electroconductive coating formed of molybdenum. In accordance with the present invention, it is contemplated to provide a metalizing composition containing tungsten or tungsten and tungsten nitride on a sintered ceramic article, such as, non-oxide type ceramic articles, for instance, silicon nitride, SiAlON, aluminum nitride type ceramics, and boron nitride type ceramics.

The following examples are presented for the purposes of illustration only, and the details therein should not be construed as limitations upon the true scope of the invention as set forth in the claims. Where not otherwise specified throughout this specification and claims, temperatures are given in degrees centigrade and parts, percentages and proportions are by weight.

EXAMPLE 1

A solution for dip coating a ceramic substrate was prepared by dissolving one gram of the reaction product of tertiary butylamine and tungsten hexachloride (I), described above, in one milliliter of hexane. In an inert atmosphere glove box or similar apparatus, a 15 gram batch of mullite whiskers was immersed in this organic solvent solution and then transferred under an argon atmosphere to a furnace equipped with a closed atmosphere system. The organic compound precursor is present as a micro-crystalline coating on the mullite whiskers. This material is heat treated under a slow stream of argon. Heat treatment involves an initial rise from ambient temperature to 600° C. at a rate of about 2 degrees centigrade per minute. The specimens are then held at 600° C. for 2 hours. This heat treatment is followed by an increase in temperature to 1200° C. at a rate of 2 degrees centigrade per minute. Upon the attainment of this temperature, the samples are held for 5 hours. The slow cooling of the coated mullite whiskers, at a 3 degrees centigrade per minute decrease in temperature, completes the heat treatment cycle. The coating of tungsten on the mullite whiskers provides a silver-grey coloration.

EXAMPLE 2

Upon compounding 20% by weight of the mullite whiskers coated with tungsten of Example 1 in a mullite composite, it has been found that the fracture toughness of the mullite composite, when tested using the short bar Chevron notch technique, is improved in comparison with a composite prepared using uncoated, mullite whiskers prepared in Example 3. Fracture toughness as measured using the short bar Chevron notch technique was 2.57 MPa$\sqrt{m}$. In comparison, uncompounded mullite was found to have a fracture toughness of 2.25 MPa$\sqrt{m}$.

EXAMPLE 3,

Control, forming no part of this invention.)

Example 2 was repeated using uncoated mullite whiskers. Fracture toughness measured using the Chevron notch (short bar) technique was 2.48 MPa$\sqrt{m}$.

EXAMPLE 4

This example discloses the application of the coating of the invention to a self-reinforced silicon nitride (high glass composition). Bend bars derived from a self-reinforcing silicon nitride composition were coated with a tungsten coating in accordance with the process of the invention. After coating with the tungsten-containing organic compound used in Example 1, followed by heat treating at 1200° C. under a nitrogen atmosphere, the bend bars exhibited the characteristic silver-grey coating color of tungsten metal. X-ray diffraction of the coated specimens revealed the presence of tungsten metal with, at most, only traces of tungsten nitride.

EXAMPLE 5

A sintered sample of aluminum nitride was cut in half and one of the two specimens obtained was coated with a solution of the reaction product of tertiary butyl amine and tungsten hexachloride (I), as used in Example 1. Three applications of the coating were applied from this solution, allowing each coating to dry prior to the subsequent application of a second and third coating. The coating procedure involved coating the aluminum nitride in an inert atmosphere glove box or similar apparatus. After the application of the third coating, the coated aluminum nitride sample was transferred to a furnace having an inert atmosphere and heat treated with a mixture of argon and ammonia. The proportion of argon to ammonia was about 3:1. The heat treatment schedule utilized was a 4° C. per minute increase in temperature from ambient temperature to 600° C.; a 1½hour hold at 600° C.; a 4° C. per minute increase in temperature from 600° C. to 1200° C.; a 2½hour hold at 1200° C.; a cool down from 1200° C. to ambient temperature utilizing a 5° C. per minute reduction in temperature. This treatment provides a composite tungsten and tungsten nitride coating on aluminum nitride.

Erosion testing of the coated aluminum nitride specimen was performed utilizing a test method generally following ASTM Test Method G-76 for erosion testing by particle impingement. The conditions for testing using both the 90° and 30° testing technique were as follows: a 29 minute test duration; a sand blast of 4.5 grams per minute; and a particle velocity of 227 feet per second. Test results which follow indicate better erosion resistance by use of the coating of the invention in the 30° erosion test method (the more severe type of erosion in terms of weight loss and wear) in comparison with the 90° erosion test method which shows little variation with respect to coated or uncoated substrates. Test results are shown in Table I below.

EXAMPLE 6

(Control, forming no part of this invention.)

The other half of the specimen of sintered aluminum nitride utilized in Example 5 was evaluated for erosion utilizing the 90° erosion test and the 30° erosion test. The conditions of testing were a sand blast using 4.5 grams per minute, at a particle velocity of 227 feet per second, for a 29 minute duration. The average of 3 tests, each performed utilizing the 90° test method and the 30° test method, are shown in Table I below.

TABLE I

| EROSION TEST DATA (ASTM G-76) | | |
|---|---|---|
| Specimen | 30° Erosion Test Number | 90° Erosion Test Number |
| Aluminum nitride, sintered (Control Example 6) | 20.34 | 7.53 |
| Aluminum nitride, sintered and coated (Example 5) | 19.46 | 7.69 |

While this invention has been described with reference to certain specific embodiments, it will be recognized by those skilled in the art that many variations are possible without departing from the scope and spirit of the invention. It will be understood that it is intended to cover all changes and modifications of the invention disclosed herein for the purpose of illustration, which do not constitute departures from the spirit and scope of the invention.

The embodiments of the invention in which an exclusive property or privilege is claimed are defined as follows:

1. A method of coating a metal or ceramic body for protection against mechanical and thermal deterioration comprising:
    (A) applying to the surface of said ceramic or metal body a precursor coating from a solution of a metal-organic compound, which is the reaction product of an alkyl or aryl amine and tungsten hexahalide, and
    (B) heating said metal or ceramic body containing said precursor coating under an inert gas atmosphere at a temperature of about 600°-1200° C. to convert said precursor coating to tungsten or a mixture of tungsten and tungsten nitride.

2. The method of claim 1, wherein said reaction product has the formula:

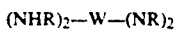

$$(NHR)_2-W-(NR)_2$$

wherein R is individually selected from an alkyl group of 1-5 carbon atoms or an aryl group of 5-10 carbon atoms.

3. The method of claim 2, wherein the metal-organic compound is the reaction product of tungsten hexachloride and tertiary-butylamine.

4. The method of claim 3, wherein said precursor coating is applied by dipping said metal or ceramic body into an organic solvent solution of said metal-organic compound.

5. The method of claim 1, wherein said metal-organic compound is applied to mullite whiskers by dip coating said mullite whiskers in an alkyl aliphatic solvent solution of said metal-organic compound and converted to tungsten by heat treatment in an argon atmosphere.

6. The method of claim 1, wherein said metal-organic compound is coated onto a silicon nitride substrate and, thereafter, converted to tungsten by heating in a nitrogen atmosphere.

* * * * *